Aug. 11, 1959 S. A. ROSEN 2,899,554

SELF RECYCLING PULSE STRETCHER

Filed Sept. 4, 1956

INVENTOR.
Samuel A. Rosen,
BY
ATTORNEY

United States Patent Office 2,899,554

Patented Aug. 11, 1959

2,899,554

SELF RECYCLING PULSE STRETCHER

Samuel A. Rosen, Sherman Oaks, Calif., assignor to Hughes Aircraft Company, Culver City, Calif., a corporation of Delaware Application September 4, 1956, Serial No. 608,647

2 Claims. (Cl. 250—27)

Figure 1:
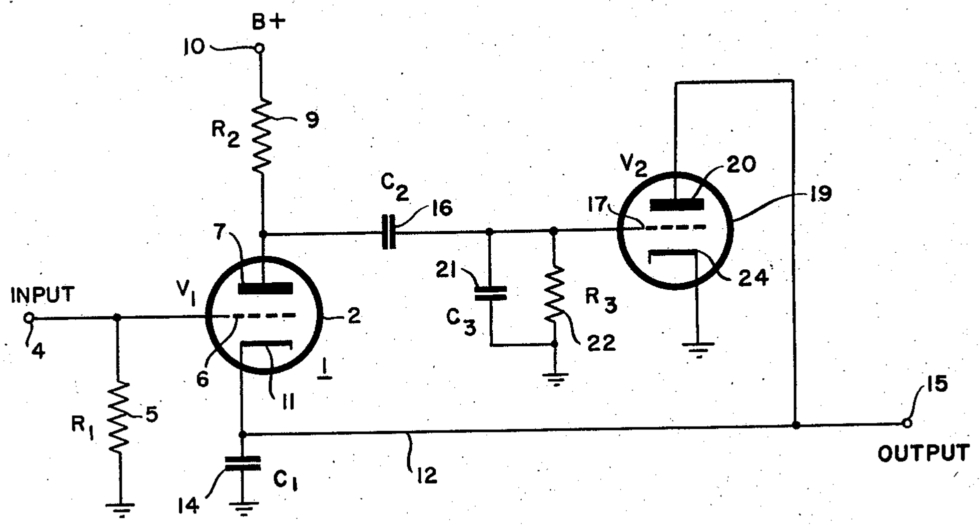

This invention relates to recycling detectors, and particularly to a self-recycling pulse stretcher for use in demodulating radio waves.

The present invention represents an improvement in methods for demodulating pulse trains of an extremely low duty ratio, which may be of the order of 0.1%. It is applicable to specialized detector circuits giving extremely rapid response to the value of the input pulse, and maintaining this output constant over a much longer interval than the usual type of detector of equally rapid response.

Such detector circuits are very effective in demodulating pulse trains representing distances and azimuthal information in radar systems. Their rapid response makes them also extremely useful in demodulating amplitude-modulated waves in which the signal frequency is comparable to the carrier frequency. Demodulation techniques are also applied to the demodulation of signal information impressed on a pulse carrier by means of time modulation.

A considerable increase in the charging current obtainable with a high-impedance signal may be secured by the use of a cathode follower circuit. In such an arrangement, the cathode potential of the detector is returned to a negative voltage. This gives a constant rate of decay of the output voltage independent of the amplitude of the input signal.

In consequence, less difficulty is encountered because of high rates of decay at low signal amplitudes.

Although the use of a long time-constant R-C output circuit gives a constant voltage output substantially equal to the peak value of the input waveform, the response of the circuit to decreases of input amplitude is often inadequate, and much information may be lost.

It has been known that improvement may be realized by completely replacing the exponential decay of the detector output by an abrupt and intentional reduction of the output voltage to zero just before the next cycle of the carrier waveform is received.

This allows the detector output to remain constant, rather than decaying exponentially, and thus permits a large increase in signal voltage. For pulse circuits this may approach the reciprocal of the duty ratio. The carrier frequencies may be nearly eliminated from the output. Finally, the output voltage is then independent of the repetition frequency.

In such prior art technique, the cathode follower detector charges the cathode-to-ground capacitance up to the peak value of the input signal.

Since there is no intentional resistance shunted across the cathode-to-ground capacitance in such a circuit, it should maintain the peak value of the input signal, with a time constant determined by the leakage of the capacitance and the heater-cathode leakage of the tube.

Just before the next recurrence of the pulse carrier, a positive recycling pulse is applied to the control grid of a following triode, the anode and cathode of which are connected across the cathode-to-ground capacitance.

As a result, the following tube conducts, reducing the potential across this capacitance almost to zero.

Immediately thereafter, the next cycle of the input wave charges the cathode follower detector to the new value of the modulating signal.

Such a circuit has limitations in demodulating pulses of microsecond duration. The detector tube impedance at zero bias is such that a cathode-to-ground capacitance no larger than 500 micromicroseconds can be charged in 1 microsecond. With the usual values of heater-cathode leakage, there may be as much as a 5 percent decay of the output voltage at pulse-recurring frequencies of 500 c.p.s. The hum due to heater-cathode leakage may amount to as much as 50 mv.

It has heretofore been necessary to supply such a recycling pulse from a separate source.

The present invention is shown as used in connection with a cathode follower circuit, with the recycling pulse supplied by the circuit itself. The circuit is thus independent of a separate recycling pulse generator.

More specifically, this circuit will produce a stretched pulse, the duration of which is variable over a wide range, and is truly independent of the width of the input pulse. The amplitude of the stretched pulse will vary directly with the amplitude of the input pulse, and be almost equal to it.

Heretofore, pulses were usually stretched by integrating them with a resistance-capacitance or inductance-capacitance circuit, and the output voltage, though proportional to the amplitude of the input pulse, was very low. Such a circuit is shown, for example, on p. 509 of vol. 19, entitled "Waveforms," of the Massachusetts Institute of Technology, Radiation Laboratory Series. In that circuit, an external recycling pulse is required which must be synchronized with the input information. The present invention is not so dependent upon an external recycling pulse, but is self-recycling.

The primary object of the present invention is thus to simplify circuitry in the demodulation field.

Another object is to improve recycling techniques. These and other objects of the invention may be better understood by reference to the drawing, in which Fig. I shows a schematic diagram of the invention.

In Fig. I, the schematic circuit diagram shows a cathode follower circuit, indicated generally as 1, and having a conventional triode 2. An input signal is applied through an input lead 4 and across an input resistor 5 to the triode control grid 6. The anode is supplied with potential through a load resistor 9 from a B+ source connected at 10. The cathode 11, from which the cathode follower output is taken through lead 12, is isolated from ground by a capacitance 14, and the output is passed to the associated circuitry through an output terminal 15.

The output from anode 7 is applied through a capacitance 16 to the control grid 17 of an auxiliary triode 19. The anode 20 of the auxiliary triode 19 is connected back to the cathode follower output lead 12. A network composed of a conventional capacitance 21 and resistor 22 is connected in parallel from control grid 17 to ground. The cathode 24 of the auxiliary triode 19 is also grounded. Conventional current and potential sources are utilized throughout, as will be understood by those skilled in the art.

When a positive pulse is applied to the control grid 6 of the triode 2, the latter draws current. This results in charging the cathode follower capacitance 14 to the peak value of the input pulse. Since capacitance 14 is charged positively, the triode 2 cuts off, and the capacitance 14 remains charged. At the same time, a high negative pulse appears at the anode 7 of triode 2, and couples over to the control grid 17 of the auxiliary triode 19.

It will be observed that the auxiliary triode 19 is in parallel with the cathode capacitance 14. As a result, the high negative pulse appearing at the anode 20 cuts off the triode 19.

Triode 19 remains cut off for a length of time determined by the time constant of the grid-to-ground network made up of capacitance 21 and resistor 22. When this network has sufficiently discharged, the auxiliary triode 19 again conducts, discharging the cathode follower capacitance 14, and the circuit awaits the next pulse.

Other modifications will suggest themselves to those skilled in the art.

It will thus be seen that means have been provided for stretching a pulse which are independent of an auxiliary pulse generating source.

I claim:

1. A pulse stretching circuit comprising an input terminal adapted to receive pulses, the duration of which is to be increased; a first tube having at least an anode, control grid and a cathode, said anode being connected through a load resistor to a source of positive potential and said control grid being connected to said input terminal; capacitive means coupling said cathode of said first tube to ground; an auxiliary tube having at least an anode, a control grid and a cathode, the control grid of said auxiliary tube being coupled to the anode of said first tube and the anode of said auxiliary tube being coupled to the junction between said cathode of said first tube and said capacitive means; an output terminal connected directly to the cathode of said first tube; and a resistance-capacitance network coupling the control grid of said auxiliary tube to a terminal maintained at a substantially fixed potential.

2. A circuit for stretching applied input pulses comprising: a first tube having at least an anode, control grid and a cathode, positive pulses to be stretched being applied to the control grid of said first tube; a first, grounded capacitor coupled to the cathode of said first tube, said first tube acting as a cathode follower and positively charging said first capacitor when an input pulse is applied; an output circuit coupled to the cathode of said first tube and to said first capacitor; a normally conducting second tube having at least an anode, control grid and a cathode, the anode of said second tube being coupled to the cathode of said first tube; a second blocking capacitor coupling the anode of said first tube to the control grid of said second tube, said second tube becoming nonconducting in response to lowering of the potential of the anode of the first tube; a network including a third capacitor and a resistor coupling the control grid of said second tube to ground, the cathode of said second tube also being coupled to ground, the time constant of said network being selected to hold said second tube nonconducting for a predetermined time; such that when said second tube resumes conduction said first capacitor is discharged and the stretched pulse thereby provided to said output circuit is terminated.

References Cited in the file of this patent

UNITED STATES PATENTS

| | | |
|---|---|---|
| 2,419,340 | Easton | Apr. 22, 1947 |
| 2,454,191 | MacDonald | Nov. 16, 1948 |
| 2,457,140 | Frankel | Dec. 28, 1948 |
| 2,572,080 | Wallace | Oct. 23, 1951 |
| 2,591,053 | De Boisblanc | Apr. 1, 1952 |
| 2,627,576 | Howarth | Feb. 3, 1953 |
| 2,662,981 | Segerstrom | Dec. 15, 1953 |
| 2,683,191 | Levy | July 6, 1954 |
| 2,688,697 | Lawson et al. | Sept. 7, 1954 |
| 2,716,211 | Aas | Aug. 23, 1955 |
| 2,719,225 | Morris | Sept. 27, 1955 |